United States Patent [19]

Giesen et al.

[11] Patent Number: 4,720,977
[45] Date of Patent: Jan. 26, 1988

[54] METHOD AND DEVICE FOR OPERATION OF A SUPERCHARGED INTERNAL COMBUSTION ENGINE

[75] Inventors: Klaus Giesen; Dietrich Distler, both of Wolfsburg, Fed. Rep. of Germany

[73] Assignee: Volkswagen Aktiengesellschaft, Wolfsburg, Fed. Rep. of Germany

[21] Appl. No.: 796,614

[22] Filed: Nov. 8, 1985

[30] Foreign Application Priority Data

Nov. 8, 1984 [DE] Fed. Rep. of Germany ....... 3440821

[51] Int. Cl.$^4$ ............................................. F02B 33/44
[52] U.S. Cl. ................................................. 60/605.2
[58] Field of Search .................. 123/425; 60/602, 605, 60/600, 601, 603

[56] References Cited

U.S. PATENT DOCUMENTS

| | | | |
|---|---|---|---|
| 2,670,724 | 3/1954 | Reggio | 123/425 X |
| 4,242,996 | 1/1981 | Urbansky | 123/425 X |
| 4,357,918 | 11/1982 | Asano | 123/425 |
| 4,385,607 | 5/1983 | Honiden et al. | 123/425 |
| 4,433,654 | 2/1984 | Yokooku | 123/425 |
| 4,452,044 | 6/1984 | Iwamoto et al. | 60/600 |
| 4,459,808 | 7/1984 | Rydquist et al. | 60/602 |
| 4,463,565 | 8/1984 | Rydquist et al. | 60/602 |
| 4,485,626 | 12/1984 | Moriguchi et al. | 60/602 |

*Primary Examiner*—Michael Koczo
*Assistant Examiner*—Richard R. Cole

*Attorney, Agent, or Firm*—Brumbaugh, Graves, Donohue & Raymond

[57] ABSTRACT

A method for operation of an internal combustion engine supercharged by means of an exhaust gas turbo-supercharger for vehicles, in particular passenger automobiles, as well as a device for putting the method into effect. In order to achieve a more rapid response of such a supercharged internal combustion engine, in particular on full load acceleration, there is to be increased during a short time, on acceleration of the internal combustion engine, the exhaust gas energy supplied to the turbine of the exhaust gas turbo-supercharger by action on the internal efficiency of the combustion engine. Thereby, the duration and/or the magnitude of the exhaust gas energy increase is to be controlled as a function of the magnitude of the desired acceleration of the internal combustion engine, i.e., e.g., the extent of the accelerator pedal actuation, and, additionally, by a parameter characterizing the state of charge of the compressor, e.g., the charge pressure or the supercharger speed. The device for putting this method into effect provides for a control device actuable on a desired acceleration of the internal combustion engine, which control device acts on a device affecting the efficiency of the internal combustion engine in the sense of a short-time increase of the energy of the exhaust gas eliminated by the internal combustion engine.

10 Claims, 2 Drawing Figures

METHOD AND DEVICE FOR OPERATION OF A SUPERCHARGED INTERNAL COMBUSTION ENGINE

BACKGROUND OF THE INVENTION

The invention concerns a method for operation of an internal combustion engine supercharged by means of an exhaust gas turbo-supercharger, for vehicles, in particular passenger automobiles, as well as a device for putting the method into effect.

So-called normally aspirated engines, i.e., engines which operate without the assistance of superchargers, have, in general, performance characteristics whereby the course of the torque as plotted against the number of revolutions at full load is practically stationary. Thus, these engines provide through each load point of their performance characteristics directly calculable acceleration values for the vehicles driven by them.

Performance characteristics with full load curves have likewise been indicated for engines with exhaust gas turbo-superchargers. However, these full load curves indicate merely the maximum attainable torque which can be provided by the engine after specified acceleration times. In addition to these "stationary" full load curves which are present only when the interplay between cylinder and exhaust gas turbo-supercharger has come to a rest, there thus occur "momentaneous" full load curves which in particular in low speed ranges are much lower, and which, moreover, are dependent upon the starting point of the pertinent full load acceleration. This means that the instanteously attainable torque is considerably below the maximum attainable torque.

During the practical operation of an internal combustion engine with exhaust gas turbo-supercharger, the aforedescribed theoretical conditions result so that during a full load acceleration from a low load and speed range the desired maximum torque is reached with a great delay, whereby the supercharger speed, or more precisely, the rate of increase of the supercharger speed, is the criterion for the rapidity with which the engine attains its stationary full load condition.

It is true that the same conditions are present not only for the points of the full load line but also for all other points of the performance characteristics, so that at each acceleration only instantaneous load values are initially attainable which are lower than the stationary load points attainable after a distinct delay. However, in the load range below full load, the operator of a vehicle equipped with a turbo-engine can still compensate for insufficient torques by fuller actuation of the acceleration pedal, which is not possible when the full load point has been attained.

SUMMARY OF THE INVENTION

Therefore, it is the purpose of the invention to create a method and a device for operation of a supercharged internal combustion engine, by which method and device the afore-indicated shortcomings can be avoided and a faster attainment of the full load can be achieved by an improved response of the exhaust gas turbo-supercharger in a turbo-supercharged internal combustion engine. Pursuant to this object and others which will become apparent hereafter, one aspect of the invention resides in a method for operation of an internal combustion engine supercharged by an exhaust gas turbo-supercharger, including increasing the exhaust gas energy delivered to the turbine of the exhaust gas turbo-supercharger for a short time by influencing the internal efficiency of the internal combustion engine.

The invention is based on the known fact that the driving force for the turbine of the exhaust gas turbo-supercharger driving the compressor is the residual energy of the exhaust gases expelled from the cylinders of the internal combustion engine. This residual energy of the exhaust gases is essentially dependent only upon the pertinent working point on the stationary engine performance characteristics. Whereas in the range of a relatively high engine speed and a large engine torque, sufficient exhaust gas is generally available in order to obtain the full supercharger pressure, which is manifested by the response of the wastegate present in most cases for partial bypass of the exhaust gas turbine, the residual energy contained in the exhaust gases within the range of a low engine speed and a low torque is not large enough to raise the exhaust gas turbo-supercharger to its full speed and the full supercharger pressure, respectively. At full load accelerations while the latter range of performance characteristics prevails, the exhaust gas turbine is unable to transmit sufficient mechanical energy to the compressor wheel out of the available energy which is too low, so that the supply of the engine cylinder with combustion air in order to generate the desired load is not sufficient.

The invention removes this disadvantage in that if a full load acceleration is demanded, the division of the energy contained in the working medium formed through the fuel-air mixture delivered to the cylinders of the internal combustion engine for processing in the cylinders of the internal combustion engine, on the one hand, and in the exhaust gas turbine, on the other hand, is modified for a very short time in favor of the turbine. Due to the increase of the exhaust gas energy made available for processing in the exhaust gas turbine and achieved through a worsening of the internal efficiency of the internal combustion engine, the turbine and thereby the compressor can be accelerated faster to higher speeds so that the compressor is able to deliver correspondingly more air into the cylinders of the internal combustion engine which, in turn, constitutes the basis for the availability of a larger combustion engine output.

Further useful refinements of the invention as well as more detailed expalnations thereof are contained in the description which follows and which refers to the example of an embodiment represented in the drawing.

DETAILED DESCRIPTION OF THE PREFERRED EMBODIMENT

Figure 1:
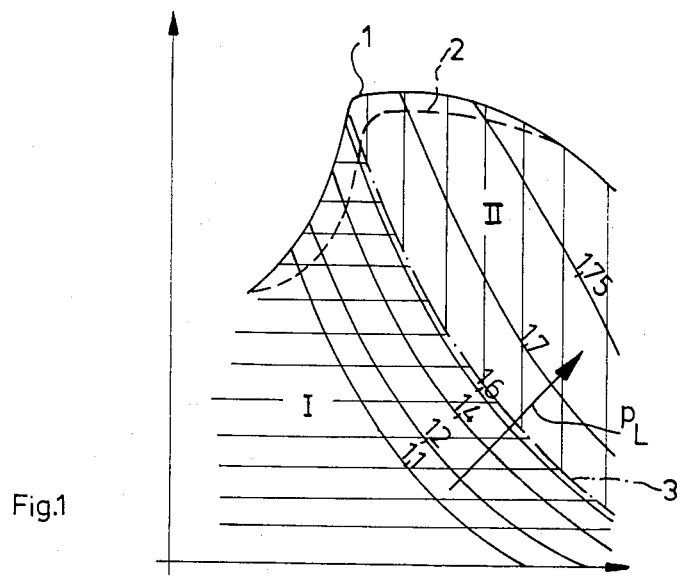
FIG. 1 shows, in the form of a diagram of the torque plotted against the engine speed, the performance characteristics of a turbo-supercharged combustion engine.

FIG. 1 of the drawing represents the performance characteristics of a customary internal combustion engine equipped with an exhaust gas turbo-supercharger, whereby the engine torque is plotted on the abscissa, and the engine speed is plotted on the ordinate. -1- designates the curve of the maximum attainable (stationary) full load line, while -2- in the form of a broken line shows the course of the minimum full load line which represents the lowest full load value attainable momentarily on full load acceleration out of a low load range. The pertinent momentary full load attainable on full load acceleration at any random low load point is placed between the two lines 1-1 and -2-. Whereas at very low speeds, the minimum and maximum full load lines may coincide since in stationary operation, no load supercharger pressure can be built up, the exhaust gas turbine is under approximately full admission in the range of higher engine revolutions, so that its speed is in any case close to its maximum speed, and possible time delays until stationary full load is attained are very short.

The diagram in FIG. 1 also shows the courses of the lines of constant supercharger pressure $p_L$ which approximately correspond also to the lines of constant supercharger speed. The line -3- in dots and dashes, in particular, indicates the pressure line at which a wastegate, usually arranged ahead of the exhaust gas turbine of the exhaust gas turbo-supercharger, opens and conducts the unutilized part of the exhaust gas energy which is utilizable in itself, past the turbine into the exhaust.

This wastegate response limit -3- divides the entire family of performance characteristics into two zones, namely, a zone I and a zone II. These two zones differ, above all, with respect to the magnitude of the residual energy contained in the exhaust gases of the internal combustion engine. Whereas during operation of the internal combustion engine within zone II, above the wastegate response limit -3-, an excess of exhaust gas energy is present, so that part of the exhaust gases are conducted unutilized past the turbine, in order to avoid an increased exhaust gas counter pressure at the exhaust valve of the engine cylinder. Because of excessive accumulation of the combustion gases, the energy contained in the exhaust gas within zone I below the wastegate response limit -3- as well as directly at the response limit is barely sufficient for driving of the exhaust gas turbine in order to generate sufficient combustion air. Accordingly, the supercharger pressure, and thus also the supercharger speed, drops considerably as the engine speed is reduced.

This is where the invention comes in and proposes that in case of full load acceleration out of a working point in zone I of the performance characteristics, there be increased for a very short time the exhaust gas energy delivered to the turbine of the exhaust gas turbo-supercharger by action on the internal efficiency of the internal combustion engine, namely, by worsening said efficiency. The duration and magnitude of such an intervention into the efficiency of the internal combustion engine may be controlled as a function of the magnitude of the desired acceleration of the internal combustion engine and the state of charge of the compressor of the exhaust gas turbo-supercharger. This intervention into the internal efficiency of the internal combustion engine which may be obtained, e.g., by adjustment of the opening time of the discharge valves or also, in a technically much simpler manner, by adjustment of the ignition time towards a delay in case of an Otto engine or of the fuel injection time in case of a diesel engine, should, for example, be obtained only when a full load acceleration is desirable, which can be determined, e.g., by means of a customary kickdown switch provided in vehicles with automatic transmission. Moreover, this intervention into the internal efficiency of the combustion engine should reasonably be effected only if an acceleration of said combustion engine out of the zone indicated by I in FIG. 1 is desirable, which can be determined by means of the state of charge of the compressor, e.g., by measurement of the charge pressure or the supercharger speed which in these cases are below the wastegate response limit -3-.

Figure 2:
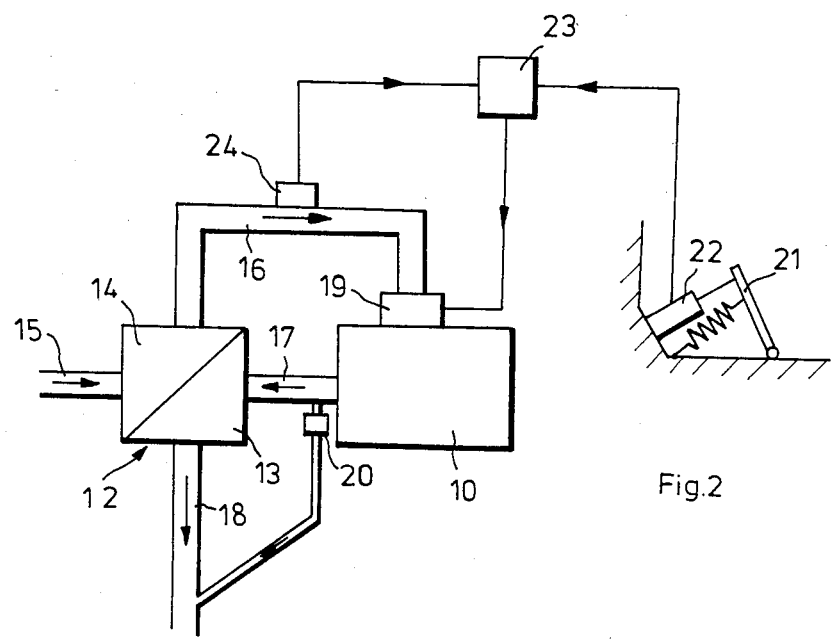
FIG. 2 shows a schematic circuit diagram of a driving arrangement composed of a combustion engine and an exhaust gas turbo-supercharger, with a device for putting the method according to the invention into effect.

FIG. 2 represents an example of an embodiment of an internal combustion engine provided with an exhaust gas turbo-supercharger whereby the method in accordance with the invention is applied.

In the circuit diagram in FIG. 2, the internal combustion engine which may be, e.g., an Otto engine or a diesel engine of an automobile, is designated by -10- and the exhasut gas turbo-supercharger associated with the combustion engine is designated as a whole by -12-. The turbo-supercharger is composed in the usual manner of an exhaust gas turbine -13- which utilizes the energy of the exhaust gases delivered by way of a connecting line -17- from the combustion engine -10- and thereby drives is compressor -14- which through a suction line -15- sucks in ambient combustion air and delivers same, at a raised pressure level, by way of the line -16- to the combustion engine. -18- designates an exhaust gas line leading to a muffler arrangement, not shown here, which succeeds the exhaust gas turbine -13-. The flow of the working medium formed of air and, respectively, an air-fuel mixture as well as exhaust gas generated from the former through combustion in the internal combustion engine -10- is indicated in the drawing by arrows.

-19- designates a device with the help of which the internal or indicated efficiency of the engine can be acted on, consisting, e.g., of an arrangement for adjustment of the opening time of the discharge valves or also, in case of Otto engines, of an arrangement for adjustment of the ignition time or, in case of diesel engines, of an arrangement for adjustment of the fuel injection time. The device -19- is actuated by a control device -23- which, on the one hand, receives a signal from a kickdown switch -22- associated with the accelerator pedal -21- as well as, on the other hand, from a charge pressure transmitter -24- detecting the state of charge of the compressor -14-. In place of the charge pressure transmitter -24- could also be provided a sensor detecting the speed of the supercharger, and in place of the kickdown switch -22- could be employed a displacement pickup detecting the adjustment position of the accelerator pedal or also of some other power control element, such as, e.g., the throttle valve in Otto engines or the speed adjustment level of the injection pump of diesel engines.

In case the operator of an automobile equipped with the supercharged internal combustion engine desires to accelerate the vehicle as indicated by the adjustment of the acceleration pedal -21-, the control device -23- determines whether, and possibly to what extent, a short-time worsening of the internal efficiency of the combustion engine is to be effected, e.g., by adjustment of the ignition time or the injection time towards a delay, in order to increase the exhaust gas energy eliminated in the exhaust gas for processing in the exhaust gas turbine -13-. As already stated above, it is useful to obtain such an exhaust gas energy increase only if a full load acceleration is desired, which is indicated by the complete depression of the accelerator pedal as far as its stop. If instead of such a kickdown switch indicating the full load acceleration desire of the operator, a displacement pickup detecting the displacement path of the accelerator pedal is employed, the decision of whether and to what extent the internal efficiency of the combustion engine is to be reduced in favor of the exhaust gas energy may also be based on the absolute magnitude of the accelerator pedal displacement path or the displacement velocity of the accelerator pedal.

As a second criterion for acting on the internal efficiency of the combustion engine is to be used i.e. the state of charge of the compressor -14-, i.e., it is to be determined if and how far the initial working point, at the instant the full load acceleration point occurs, is separated from the wastegate response limit designated by -3- in FIG. 1. The further the distance from the wastegate response limit -3- of the working point prior to the full load acceleration in the zone designated by I, the greater and the longer should be this action on the internal efficiency of the combustion engine, in order to make available to the exhaust gas turbine -13- sufficient energy for acceleration of the compressor -14-.

As a matter of principle, it may be stated, however, that this intentionally caused worsening of the internal efficiency of the combustion engine in favor of the exhaust gas energy should subsist only a few fractions of seconds, and that it serves only for a faster start of the compressor of the exhaust gas turbo-supercharger. As a result of the more rapid delivery of more compressed air to the combustion engine obtained thereby, the total response of the turbocharged combustion engine can be substantially improved, especially since the reductions in output due to the short-time worsening of the internal efficiency of the engine are thereby more than compensated for.

It is particularly in case a diesel engine is used as a combustion engine that other special advantages can be obtained through the short-time ignition time delay of the injection pump at full load acceleration in accordance with the invention. For example, it has been determined that while it is true that an adjustment towards a delay of the injection point somewhat reduces the output, it is also true that the increased soot formation which occurs in particular on acceleration to the full load range is being reduced so that through an additional fuel delivery during the action on the efficiency of the engine, the diminution in output can be easily compensated. On the other hand, without any additional fuel delivery, some reduction in soot emission can be achieved, even if the injection time adjustment lasts only a short period of time.

Furthermore, the method in accordance with the invention and the device operating in accordance with said method offer the possibility for a different design of the turbo-supercharger. Heretofore, such a supercharger was rendered smaller than optimally desirable so that precisely at small loads, somewhat reasonable load conditions could still be attained. However, the supercharger was then no longer optimally designed for the ranges for which it was particularly necessary, namely, the higher load range(s). A measure for such a design is the position of the wastegate response limit designated by -3- in FIG. 1 which indicates from when on the supercharger would generate more air than needed by the internal combustion engine.

If the method in accordance with the invention is applied, the wastegate response limit can be shifted in the performance characteristics field towards larger loads by a correspondingly larger dimensioning of the supercharger. The wastegate designated in FIG. 2 by -20- can then open at higher speeds and, respectively, higher torque values or can possibly be eliminated in its entirety. By means of the measure in accordance with the invention for an exhaust gas energy increase at full load acceleration, it can then be ensured in all cases that a larger supercharger, too, starts rapidly and effectively and thus delivers the additional air needed for the increased output. The use of larger compressors which becomes possible without any disadvantages then also facilitates an improvement of the efficiency of the process cycle as a whole due to an improved breathing or gas reversal loop, namely, in the stationary state, in that at equal fuel quantities an increase of the effective pressure, can be achieved, or, if the effective pressure is maintained, a reduction of the fuel quantity can be achieved. From this also follows that neither the mechanical nor the thermal load of the engine exceeds predefined limits. Thereby, the fuel-air ratio changes towards the leaner, while the soot limit which constitutes a full load criterion for diesel engines is further removed.

The aforedescribed manner of enlargement of the compressor can be utilized essentially only in case of diesel engines in that such engines not only permit a leaner fuel-air ratio, such as connected with an increased air supply, but thereby even react favorably as regards emission and consumption. In case of Otto engines, however, fuel would have to be added corresponding to the additional air quantity supplied by the larger supercharger, resulting in the risk that prederfined thermal limits of the engine are exceeded.

While the invention has been illustrated and described as embodied in a method and device for operation of a supercharged internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for operating and accelerating an internal combustion engine assisted by a turbo-supercharger having a turbine driven by exhaust gas energy of exhaust gas delivered from the engine through an exhaust gas line, the engine including an acceleration pedal and
   a wastegate in the exhaust gas line ahead of the turbine, the wastegate opening automatically upon exceeding a predetermined supercharger pressure, the method comprising the step of:
   increasing the exhaust gas energy delivered to the turbine for a short period of time by reducing internal efficiency of the engine when the acceleration pedal is fully depressed and the supercharger pressure prior to depression of the accelerator pedal is below said predetermined pressure.

2. A method as defined in claim 1, wherein said step of increasing exhaust gas energy includes controlling the period of time and magnitude of said exhaust gas energy increase as a function of a desired acceleration of the internal combustion engine.

3. A method as defined in claim 1, wherein said step of increasing exhaust gas energy includes controlling the period of time of the exhaust gas energy increase as a function of a desired acceleration of the internal combustion engine.

4. A method as defined in claim 1, wherein the turbo-supercharger includes a compressor, said step of increasing exhaust gas energy including controlling the period of time and magnitude of the exhaust gas energy increase as a function of a parameter characterizing the state of charge of the compressor.

5. A method as defined in claim 1, wherein the turbo-supercharger includes a compressor, said step of increasing exhaust gas energy including controlling the period of time of the exhaust gas energy increase as a function of a parameter characterizing the state of charge of the compressor.

6. A method as defined in claim 1, wherein the internal combustion engine is an Otto engine, said step of increasing the exhaust gas energy including adjusting the ignition setting of the internal combustion engine towards retardation.

7. A method as defined in claim 1, wherein the internal combustion engine is a diesel engine, said step of increasing the exhaust gas energy including adjusting the fuel injection point towards retardation.

8. A method as defined in claim 1, wherein the internal combustion engine has exhaust valves, said step of increasing the exhaust gas energy including advancing the opening time of the exhaust valves.

9. A method as defined in claim 1, wherein said step of increasing exhaust gas energy includes controlling magnitude of the exhaust gas energy increase as a function of a desired acceleration of the internal combustion engine.

10. A method as defined in claim 1, wherein the turbo-supercharger includes a compressor, said step of increasing exhaust gas energy includes controlling magnitude of the exhaust gas energy increase as a function of charge of the compressor.

* * * * *